March 23, 1948. A. J. R. SCHUMAKER 2,438,458
CALCULATOR
Filed Feb. 10, 1944 2 Sheets-Sheet 1
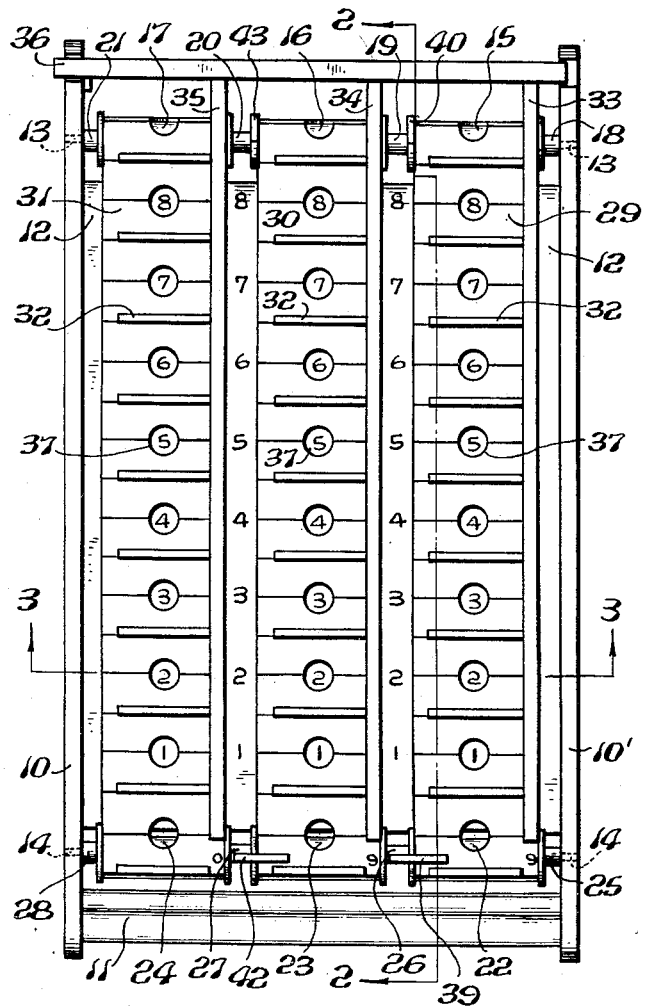
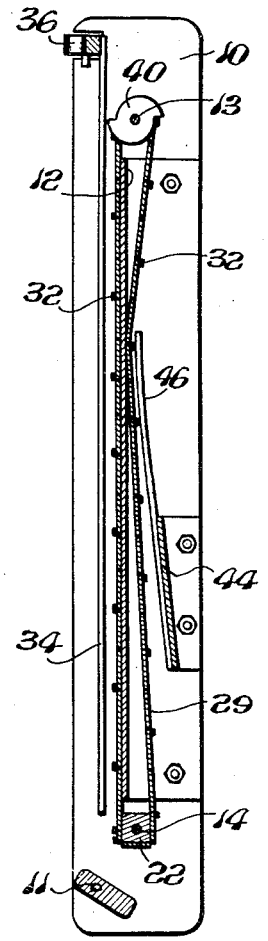
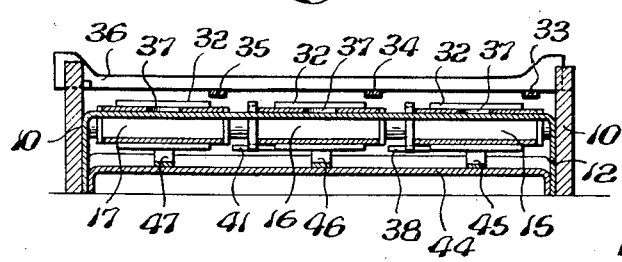
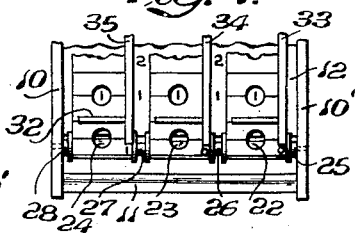
INVENTOR.
A.J.R. SCHUMAKER
BY
Atty.

March 23, 1948.  A. J. R. SCHUMAKER  2,438,458
CALCULATOR
Filed Feb. 10, 1944  2 Sheets-Sheet 2
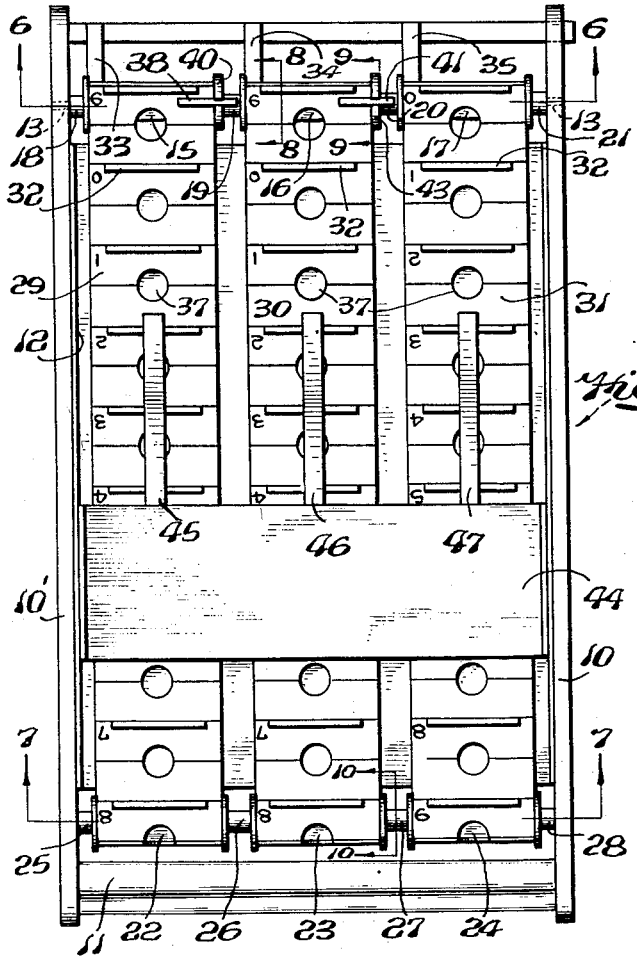
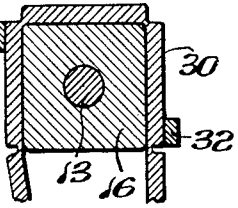
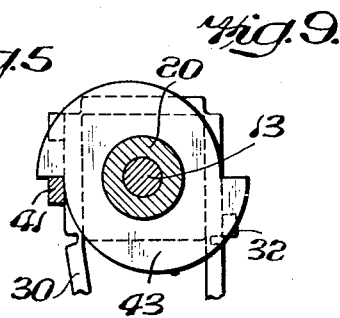
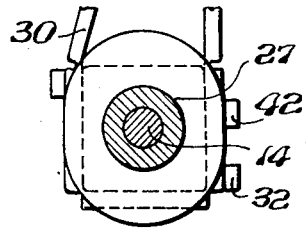
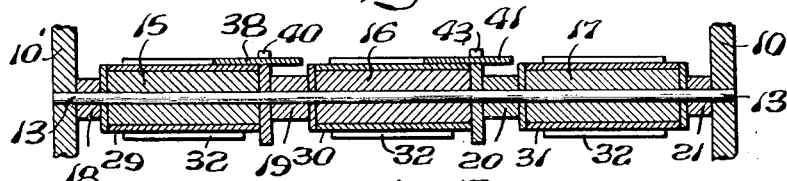
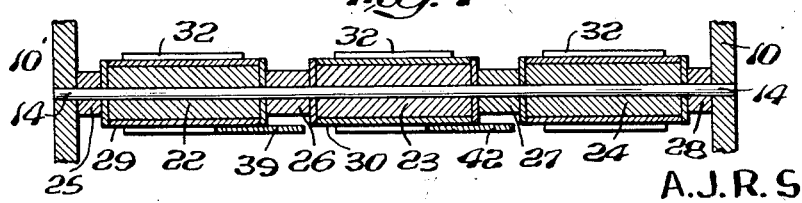
INVENTOR.
A. J. R. SCHUMAKER
BY
Atty.

Patented Mar. 23, 1948

2,438,458

UNITED STATES PATENT OFFICE 2,438,458

CALCULATOR

Albert J. R. Schumaker, Harpers Ferry, W. Va.

Application February 10, 1944, Serial No. 521,765

6 Claims. (Cl. 235—71)

My invention is a simple and inexpensive calculator or adding machine for the mechanical performance of arithmetical operations.

In its preferred form it comprises a plurality of endless belts movable in juxtaposed parallel relation and each bearing a plurality of series of digits 0 to 9 inclusive. Each belt is provided with means for manually effecting longitudinal shifts thereof of an extent or throw predetermined to move a desired number of the digits thereon past a datum or totalizing position. All such digits on the front of the belts, excepting those in the totalizing position, may be hidden by suitable shields thereover.

Each belt, except the leftmost, carries an actuator adjacent to the end of each series of digits thereon, so that as the last of the digits of either series on a belt passes from the datum or totalizing position and around the lower bight of the belt, one or both of the actuators passing around the bights of such belt effects the movement of the belt to the left thereof a distance sufficient to move a single digit on the latter belt past the datum position. Preferably such movements of the respective belts is effected by the engagement of one or both actuators with a ratchet or ratchets connected with a roller or rollers over which the actuated belt is looped.

The manual longitudinal translation of the belts may be facilitated by the provision of catches or finger pieces thereon adjacent to the respective digits for engagement by a stylus or the finger of the operator. The downward movement of the finger or stylus may be limited by a stop member positioned adjacent to the datum or totalizing position.

The number of digits of any belt which will be moved past the datum or totalizing position by a belt movement of given extent may be determined by reference to indicator digits adjacent to the belts and in fixed relation to the stop member. The indicator digits may be conveniently mounted on a plate or partition around which the belts are looped; the digit-bearing sections of the partition being exposed between the belts or through apertures in the belts.

Preferably each belt is mounted on a pair of rollers, at least one of which is of polygonal contour, and the belts may be tensioned by leaf springs bearing thereon to improve traction and maintain a fixed relation between the belt and the peripheries of the rollers.

The characteristic features and advantages of my improvements will further appear from the following description and the accompanying drawings of an illustrative embodiment of my invention.

In the drawings, Fig. 1 is a front elevation of a calculator embodying my invention; Fig. 2 is an irregular longitudinal sectional view taken on the line 2—2 of Fig. 1; Fig. 3 is a transverse sectional view taken on the line 3—3 of Fig. 1; Fig. 4 is a fragmentary view of the lower portion of the calculator after the belts have been moved from the position shown in Fig. 1; Fig. 5 is a rear elevation of the calculator; Fig. 6 is a transverse sectional view on the line 6—6 of Fig. 5; Fig. 7 is a transverse sectional view on the line 7—7 of Fig. 5; Fig. 8 is a fragmentary transverse sectional view on the line 8—8 of Fig. 5; Fig. 9 is a fragmentary transverse sectional view on the line 9—9 of Fig. 5; and Fig. 10 is a transverse sectional view on the line 10—10 of Fig. 5.

The embodiment of my invention illustrated in the drawings comprises a frame having side bars 10, 10', a pivoted, rocking bottom cross-bar 11 providing a stop, and a web or partition 12 having integral side flanges secured to the side bars 10, 10'. Shafts 13 and 14 are journalled in the side bars at the top and bottom of the frame respectively. The upper shaft 13 has journalled thereon the flanged rollers 15, 16 and 17 preferably of polygonal, as, for instance, square, cross section. A cylindrical spacer 18 spaces the roller 15 from the side bar 10', a cylindrical hub 19, fixed to the roller 16, spaces it from the roller 15, a cylindrical hub 20, fixed to the roller 17, spaces it from the roller 16, and a cylindrical spacer 21 spaces the roller 17 from the side bar 10.

The lower shaft 14 has journalled thereon the flanged rollers 22, 23 and 24 preferably of polygonal, as, for instance, square, cross section. The bottom rollers are separated from the frame sides and from one another by the cylindrical spacers 25, 26, 27 and 28.

Endless belts 29, 30 and 31 are looped over the respective pairs of rollers 15 and 22, 16 and 23, and 17 and 24. The belts are held against axial movement relatively to the shafts 13 and 14 by the flanges on the rollers, but are readily movable lengthwise of the partition 12 and around their respective pairs of rollers by means of transverse strips 32 forming finger-pieces equi-distantly spaced along the respective belts.

Each belt is preferably composed of forty sections or segments hinged together and each corresponding in size to a face of a polygonal roller. The alternate segments are numbered consecutively from 0 to 9, inclusive, so as to form two consecutive series of digits. The digits are preferably positioned along an edge of the belt adjacent to the ends of the respective finger-pieces 32, and the finger-pieces are preferably located adjacent to the hinged joint between two consecutive belt sections. To avoid confusion, all but the lowermost numbers on the fronts of the belts may be covered by opaque shields 33, 34 and 35 depending from a cross bar 36; thereby leaving visible only the digits on the belt segments engaging the flat front faces of the lower rollers 22, 23 and 24.

The partition 12 has on the front face thereof a plurality of vertical series of consecutive digits, say from 1 to 8 inclusive. Some of such series of digits are visible between the belts, and other series may be made visible by apertures 37 in the respective belts between the finger-pieces 32 thereon.

Adjacent to the end of each series of digits on the belt 29, there is fixed an actuator pin or fixed pawl 38, 39, projecting laterally from the belt beyond the edge thereof and into the path of a toothed flange or ratchet 40 fixed on the hub 19.

Adjacent to the end of each series of digits on the belt 30, there is fixed an actuator pin or fixed pawl 41, 42 projecting laterally from the belt 30, beyond the edge thereof, and into the path of a toothed flange or ratchet 43 fixed on the hub 20.

The teeth of the ratchets 40 and 43 are similar to one another and each tooth has a radial face and a cam peripheral face. When a moving actuator pin engages a radial face of a tooth, the corresponding ratchet is moved a half revolution. If, however, an actuator pin is moved in a direction causing it to ride on the cam surface of a tooth, the corresponding ratchet is not moved. Hence each ratchet is a one-way ratchet, being movable in only one direction by the translation of the belt adjoining at the right when facing the calculator (Fig. 1). Each of the rollers 16 and 17 is turned a half rotation upon every fifth revolution of the respective rollers to the right thereof by the belts carried by such rollers. Ratchets such as described may be attached to the upper rollers only or to both upper and lower rollers carrying the belts 30 and 31.

A cross bar 44 is fixed to the side bars 10, 10' and supports yielding spring fingers 45, 46 and 47 which bear against the backs of the respective transversely grooved belts 29, 30 and 31 so as to hold such belts under tension and maintain their segments in close engagement with the flat faces of the rollers by which they are supported.

The digits on the belt 29 represent units, the digits on the belt 30 represent tens, and the digits on the belt 31 represent hundreds. Additional belts may be provided to the left of the belt 31 to carry digits representing thousands, tens of thousands, hundreds of thousands, millions, etc.; each succeeding belt to the left being moved by pawl and ratchet mechanism as above described a distance equal to one-tenth of the distance moved by the actuating belt to the right thereof.

In the operation of the calculator, the belts are initially so positioned that a zero is displayed on each belt below the shields 33, 34 and 35. The belt 29 is then shifted downward to display below the shield 33 the unit digit of the first number to be added, for example 9 (Fig. 1). The belt 30 is then shifted downward to display below the shield 34 the tens digit of the first number to be added, for example 9, thus showing the number 99 as the first of the numbers to be added. If there were a hundreds digit in the first number to be added, the belt 31 would be shifted downward to show such hundreds digit below the shield 35, and so on.

The movements of the belts result in the display of all the digits of the first number in proper order and alignment, in what may be called the totalizing or datum position, with belt sections bearing the displayed digits lying flat against the flat front faces of the rollers 22, 23, 24. The bar 11 may be rocked into engagement with the finger pieces on the respective belts for aligning digits on the respective belts.

Each shifting of the belts may be conveniently effected by engaging an appropriate projecting finger-piece 32 with a finger or stylus and pressing downward until the finger or stylus is halted by the stop bar 11. This bar is so positioned with respect to the shaft 14, that the stoppage of the finger or stylus leaves flat against a front roller face the section of the belt to which the engaged finger piece is attached. The appropriate finger-piece to be engaged by finger or stylus is indicated by the digits on the partition 12. Preferably such digits are so positioned that the engagement of a finger or stylus with a finger-piece immediately below any partition digit and movement of such finger-piece downward as far as possible will result in a movement of a belt sufficient in extent to move through the totalizing position a number of belt digits equal to the number of the partition digits initially immediately above the finger-piece engaged.

The belt 29 is then moved a distance appropriate to the unit digit of the next number to be added. For instance, if such unit digit of the next number is 1, the finger-piece on the belt 29 immediately below the partition digit 1 will be engaged by a finger or stylus and moved downward until the finger or stylus engages the stop bar 11. This movement of the belt 29 brings into view, below the shield 33, the digit "0," and also causes the actuator 39 to engage a tooth of the ratchet 40 and turn the roller 16 a half revolution. This rotation of the roller 16 moves the belt 30 so as to bring into view, below the shield 34, the digit "0" and also causes the actuator 41 to engage a tooth of the ratchet 43 and turn the roller 17 a half rotation. This moves the belt 31 sufficiently to display the digit 1, as shown in Fig. 4.

If the second number to be added contains tens and hundreds digits, the belts 30 and 31 are moved downward in proportion to such digits by engaging the finger-pieces 32 on the respective belts immediately below the partition digits corresponding to the digits in the number to be added.

Any desired number of numbers can be thus added and the totals will be displayed in the totalizing positions along the lower rollers.

Should the digits of the total not be in perfect alignment, the stop bar 11 may be rocked so that its inner edge engages and aligns the lowermost finger-pieces on the belts; thereby aligning the digits of the total.

Having described my invention, I claim:

1. A calculator comprising a plurality of digit-bearing belts, rollers on which the respective belts are looped, and means for effecting a proportional movement of one of said belts upon a predetermined movement of another of said belts in one direction only and including a one-way pawl and ratchet mechanism having an actuator carried by said last named belt and a member complementary to said actuator and carried by a roller on which said first named belt is looped, said actuator being slidable over said member upon reverse movement of the second named belt without operating the first named belt.

2. A calculator comprising a series of belts each bearing an even number of series of digits, rollers on which said belts are looped, and means at each end of one of said belts for moving it a proportional distance upon a predetermined movement of another of said belts and including one-way pawl and ratchet mechanisms comprising an actuator carried by said last named belt adjacent to the end of each series of digits thereon and a ratchet fixed to a roller at each end of said first named belt and on which it is looped, said actuator being guided by its supporting belt into engagement with said ratchet.

3. A calculator comprising two sets of square rollers rotatable on spaced shafts, belts looped over complementary rollers of the respective sets, each belt having two series only of digits 0 to 9 inclusive thereon, and means comprising one-way pawl and ratchet mechanisms for transmitting proportional movement from one of said belts to a belt to the left thereof, said mechanism including one-way ratchets on each of the rollers carrying the leftward belt and a plurality of pawls carried by the rightward belt and operating the ratchet to the leftward thereof upon movement of a rightward belt in one direction only.

4. A calculator comprising a plurality of digit bearing belts, independently rotatable pairs of rollers on which the respective belts are looped, and means for effecting a half revolution of a roller of one pair upon each fifth revolution of a roller of another pair and comprising one-way pawl-and-ratchet mechanism including an actuator carried by the belt looped on the last named pair and a member complementary to said actuator and connected with a roller of the first named pair to move the belt thereon a predetermined distance in one direction only relatively to the actuator-carrying belt.

5. A calculator comprising a plurality of digit bearing belts and pairs of rollers spanned by the respective belts, each belt and pair of rollers having complementary elements positively preventing slippage of the belt around the peripheries of its rollers, and a carry-over mechanism comprising an actuator attached to a belt bearing digits of a set of lower significance and a ratchet attached to a roller carrying a belt bearing digits of a set of higher significance, said ratchet having teeth engaged by said actuator to translate said second named belt upon movement of the first named belt in one direction and permitting movement of the first named belt in the reverse direction without translating the second named belt.

6. A calculator comprising a plurality of digit bearing belts and pairs of rollers spanned by the respective belts, each belt and pair of rollers having complementary elements positively preventing slippage of the belt around the peripheries of its rollers, and a carry-over mechanism comprising actuators attached in fixed relation to a belt bearing digits of a set of lower significance and a ratchet fixed to a roller aforesaid carrying a belt bearing digits of a set of higher significance, said ratchet having teeth each of which is complementary to and operated only by one of the said actuators.

ALBERT J. R. SCHUMAKER.

REFERENCES CITED

The following references are of record in the file of this patent:

UNITED STATES PATENTS

| Number | Name | Date |
|---|---|---|
| 158,853 | Martin | Jan. 19, 1875 |
| 595,347 | Schabadt | Dec. 14, 1897 |
| 725,242 | Goldfarb | Apr. 14, 1903 |
| 773,675 | Powell et al. | Nov. 1, 1904 |
| 816,342 | Kodama et al. | Mar. 27, 1906 |
| 924,320 | Cheape | June 8, 1909 |
| 2,129,265 | Duby | Sept. 6, 1938 |

FOREIGN PATENTS

| Number | Country | Date |
|---|---|---|
| 344,772 | Germany | Dec. 1, 1921 |
| 98,893 | Germany | Sept. 3, 1898 |

OTHER REFERENCES

Fig. 57 on page 30 of Hiseox's Mechanical Movements, published in 1911 by the Norman W. Henley Pub. Co. of 132 Nassau St., New York.